Feb. 12, 1935.  T. F. MANDAHL  1,991,286
FILTER
Filed Feb. 24, 1932
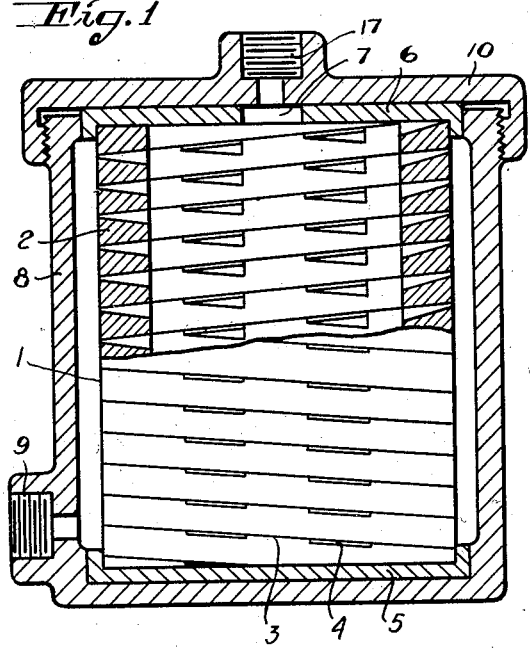
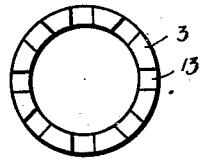
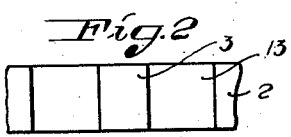
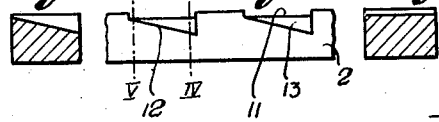
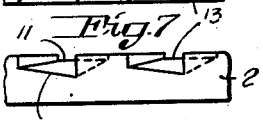
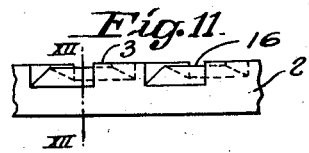

Patented Feb. 12, 1935

1,991,286

UNITED STATES PATENT OFFICE 1,991,286

FILTER

Thor Fridolf Mandahl, Stockholm, Sweden, assignor to Svenska Ackumulator Aktiebolaget Jungner, Stockholm, Sweden, a joint-stock company of Sweden Application February 24, 1932, Serial No. 594,931
In Sweden February 28, 1931

11 Claims. (Cl. 210—169)

The present invention relates to an arrangement for straining, filtration and separation of solid particles out of liquids or gases such as air, as well as for separation of water from air and liquids, and for separation of different solid particles from each other.

One disadvantage of all filters as hitherto known is that they have a tendency toward very rapid clogging (by reason of the fact that the filter slits have too large areas wherein the silt particles are apt to stick). Other drawbacks are the difficulty of cleaning them and the risk of damaging them in cleaning.

The present invention aims at obviating these disadvantages in strainers and filters for the above-mentioned purposes, by making the filter in such a manner that the smallest section of the filter slit is as short as possible in the filtering direction, whereby the risk of clogging is lessened as far as possible. The filter consists of wires or bands superimposed on each other and provided with transverse incisions for the passage of the filtering material. According to the invention, said incisions are, in the filtering direction, deeper or larger at the one edge of the wire or band than at the other, and are disposed in such a manner that conical slits are formed between the wires or bands, in order to accelerate the permeability in the filtering direction so as to lessen the risk of silt particles being caught in the filter slits.

Likewise, wires or bands of this nature may be provided, according to the invention, with abutments, grooves etc., which are so shaped that the direction of the inlet of the liquid or gas will be such that a component of the velocity of flow is obtained in the longitudinal direction of the filter slit, and that the direction of the outlet deviates from the inlet direction.

This component of the velocity of flow in the longitudinal direction of the filter slit causes the larger impurities, which cannot pass through the inlet (smallest section) of the filter slit, to be carried off in the longitudinal direction of the filter slit against the adjacent abutment, where they deposit and considerably lessen the risk of the filter slit becoming clogged.

The alteration of the direction at the passage of the liquid or gas through the filter slit causes eddies in the filter slit, which prevents those particles or impurities, that have passed through the inlet (smallest section) of the filter slit, from depositing on the inner surfaces of the filter slit.

Likewise, the invention may comprise two or more wires or bands of this nature and of suitable cross-section laid spirally to any suitable shape, the several wires or bands having abutments, grooves and incisions, and being twisted or curved in such a manner that conical filter slits are produced between the turns of the wires or bands.

Also, the abutments, grooves, incisions etc. of such wires or bands in a spiral may be higher or larger for one linear part than for the next linear part of the same wire or band, so that, where such wires or bands are erected, laid or arranged turn upon turn to form a filter, conical filter slits are produced which are adapted for coarse filtration up to fine filtration.

Moreover, filters made in accordance with the invention (with filter slits of different sizes) may co-operate to bring about the desired filtration if, for instance, the filters are placed outside each other or in such a manner that an upright wire filter and a spiral filter disposed closely adjacent to each other form apertures where the respective filter slits cross one another.

Filter spirals of such a wire or band, as well as wire or band rings forming filter bodies, as comprised by the invention, may, if required, be provided with adjustable or fixed guides or frames of any suitable shape, which ensure that the filter slits maintain their proper mutual position for the obtention of the desired filtration.

One of the great advantages of the invention is that in a wire or band filter of this type, the abutments, grooves and incisions of which are higher or deeper at the one edge of the wire or band than at the other, it will be easy to grind off the one edge of the wire or band spiral to obtain the desired filter area (filter openings).

A few examples of embodiment of the invention are illustrated in the accompanying drawing.

Fig. 1 is a longitudinal section of a filter box with a filter body shown partly in longitudinal section and partly in elevation. Fig. 2 shows a portion of a helically wound wire or band arranged according to the invention and viewed from above. Fig. 3 shows the same band portion in elevation. Figs. 4 and 5 are sections on line IV—IV and V—V, respectively, of Fig. 3. Fig. 6 is a fragmentary top view of a further embodiment of the invention, and Fig. 7 is a fragmentary side elevation of the same. Figs. 8 and 9 show an embodiment of a filter body viewed in elevation and in plan view respectively, said filter body consisting of rings of wire or band material superimposed on each other. Fig. 10 is a fragmentary top view of a further embodiment of the invention. Fig. 11 is a fragmentary side elevation thereof. Fig. 12 is a section on the line XII—XII of Fig. 11.

According to Fig. 1, the filter body consists of a helically wound spiral 1 composed of a wire 2 with abutments 3 forming conical slits 4 between the turns of the wire. The height, length and width of the abutments 3 determine or decide the permeability of the slits 4 for straining or filtration. A bottom 5 and a cover 6 may, if desired, be soldered to the wire 2. The cover 6 has an outlet 7. The spiral 1 is inserted into the filter box 8, which is provided with an inlet opening 9, and the spiral is kept compressed by the cover 10 provided with an outlet opening 17, so that the abutments 3 bear on the wire 2, conical slits 4 being thus produced.

In the embodiment according to Figs. 2-4, the incision 13 in the wire is deeper at the one edge than at the other, and as the wire is helically wound, there will be formed conical slits 4 (Fig. 1) for the purpose of accelerating the permeability in the filtering direction.

Figs. 2 to 5 show the wire 2 with the abutments 3 and lateral edges 11 and 12 of the incision 13, the edge 11 being substantially parallel to the central axis of the wire 2 and the edge 12 forming an angle with the central axis, which may be substantially equal to the angle of inclination of the wire when the latter is wound to form a spiral.

Figs. 6 and 7 show a wire 2, in which the edges 14 and 15 of the transverse abutments 3, which edges may be parallel to each other, form an angle with the central axis (longitudinal direction) of the wire 2, the lateral edge 11 of the incision 13 being parallel to the central axis of the wire 2, while the lateral edge 12 forms an angle with the central axis which may be substantially equal to the angle of inclination of the wire 2 when the latter is wound to form a spiral.

Figs. 10-12 show a wire or band with ridges 16 and abutments 3, the lateral edges 14 and 15, which may be parallel to each other, forming an angle with the central axis of the wire 2. In the embodiment shown in Figs. 10-12, the filtration or straining takes place through a slit which is decreasing in width, and then, in the filtering direction, through a widening slit.

Instead of making the filter body of a coherent wire or band, it may, as will be seen from Figs. 8 and 9, be made of wire or band rings placed upon each other, said rings being provided with incisions 13 etc. in agreement with the embodiments above described.

Wires or bands or the like with a cross section according to the invention are suitable for all embodiments of filter and strainer bottoms as well as of filter and strainer elements.

The impurities depositing in the filter slit are easily removed in a filter spiral, for example, by the same being pulled apart and washed clean.

The filter slits obtained through the invention permit, as has been found by practical trials, an exact smallest height of 10/1000–15/1000 millimeters, which hitherto has been unobtainable, and, consequently, impurities larger than those of a cross dimension of 10/1000 to 15/1000 millimeters cannot pass through the filter slit.

Filtration up to such a degree of fineness may also take place at high pressures, without, for instance, a filter spiral or filter element according to the invention being deformed.

Filters according to the invention are particularly suitable for oil motors with direct injection, and for the purification of oils or, generally, where an extremely accurate fine filtration is necessary.

What I claim is:—

1. A filter unit comprising a pair of band sections having adjacent faces in contact, one band section having transverse contact ridges engaging the adjacent surface of the other section, whereby a plurality of filter passageways are formed between said sections by the respective adjacent pairs of ridges, each passageway having a minimum cross-sectional area spaced from the exit end of the passageway and at least one wall of each passageway being inclined to the longitudinal axis of the ridged sections, thereby to direct the fluid flowing through said passageway in a direction having a component parallel to the said longitudinal axis.

2. A filter unit comprising a pair of band sections having adjacent faces in contact, one band section having transverse contact ridges engaging the adjacent surface of the other section, whereby a plurality of filter passageways are formed between said sections by the respective adjacent pairs of ridges, at least one wall of each passageway being inclined to the longitudinal axis of the ridged sections, each passageway having a minimum cross sectional area at one edge of the band section and defined in part by said inclined wall of the passageway, the opposite end of said inclined wall meeting the opposite edge of said band section in a line which is inclined to the longitudinal axis of the band section, thereby to direct the fluid flowing through said passageway in a direction having a component parallel to the said longitudinal axis of the band section.

3. A filter unit comprising a pair of band sections having adjacent faces in contact, one band section having transverse contact ridges engaging the adjacent surface of the other section, whereby a plurality of filter passageways are formed between said sections by the respective adjacent pairs of ridges, each passageway having a minimum cross-sectional area spaced from both ends of the passageway and at least one wall of each passageway being inclined to the longitudinal axis of the ridged sections, thereby to direct the fluid flowing through said passageway in a direction having a component parallel to the said longitudinal axis.

4. A filter unit comprising a ribbon helically wound to contact the adjacent turns thereof, one face of said ribbon being substantially flat and the opposite face being provided with alternating transverse ridges and passageways, each passageway having a greater cross-sectional area at one edge of the ribbon than at another region of the passageway, and one side wall of the passageway at said greater cross-sectional end meeting the edge of the ribbon in a line which is inclined to the longitudinal axis of the ribbon by an angle substantially equal to the pitch of the helix.

5. A filter unit comprising a pair of band sections having adjacent faces in contact, one band section having transverse contact ridges engaging the adjacent surface of the other section, whereby a plurality of filter passageways are formed between said sections by the respective adjacent pairs of ridges, each passageway having a minimum cross-sectional area spaced from the exit end of the passageway and at least one transverse side wall of one of the contact ridges defining each passageway being inclined to the longitudinal axis of the ridged sections, thereby to direct the fluid flowing through said passageway in a direction having a component parallel to the said longitudinal axis.

6. A filter unit comprising superposed and contacting ribbon sections, the contact face of one section being provided with transverse ridges and passageways between said ridges, each of said passageways having a minimum cross-sectional area located between the edges of the ribbon sections.

7. A filter unit comprising superposed and contacting ribbon sections, the contact face of one section being provided with transverse ridges extending obliquely of the longitudinal axis of the ribbon sections and passageways between said ridges, each of said passageways having a minimum cross-sectional area located between the edges of the ribbon sections.

8. A filter unit comprising a helically wound ribbon provided with transverse ridges and passageways between said ridges, said passageways having a greater cross-sectional area at the one edge of the ribbon than at the opposite edge, the one side edge of each passageway being substantially parallel with the longitudinal axis of the ribbon, while the other edge thereof forms an angle with said axis, the said transverse ridges running obliquely with relation to the longitudinal axis of the ribbon.

9. A filter unit as claimed in claim 6, wherein the said transverse ridges extend obliquely of the longitudinal axis of the ribbon section.

10. A filter unit comprising a pair of superposed ribbon sections having their adjacent faces in contact, one section having a smooth contact face and the other having a face defined by walls forming alternating contact ridges and passageways, the side walls of the ridges being arranged obliquely to the longitudinal axis of the ridged ribbon section, and at least a part of the passageway wall between opposed side walls of the ridges defining the same is inclined to form a passageway having a maximum cross-sectional area at one edge of the superposed ribbon sections.

11. A filter unit comprising a pair of superposed ribbon sections having their adjacent faces in contact, one section having a smooth contact face and the other having a face defined by walls forming alternating contact ridges and passageways, the side walls of the ridges being arranged obliquely to the longitudinal axis of the ridged ribbon section, and the passageway wall between opposed side walls of the ridges comprising two inclined sections which flare outwardly from their junction between the edges of the ridged ribbon section to form a passageway having a minimum cross-sectional area intermediate the said edges.

THOR FRIDOLF MANDAHL.